(12) United States Patent
Chapalamadugu et al.

(10) Patent No.: US 10,791,029 B2
(45) Date of Patent: *Sep. 29, 2020

(54) TIER BASED VIRTUAL NETWORK FUNCTION CHAINING DESIGN

(71) Applicant: Verizon Patent and Licensing Inc., Arlington, VA (US)

(72) Inventors: Mahesh Chapalamadugu, Irving, TX (US); Raju Sharma, Raleigh, NC (US); Manish Srivastava, Frisco, TX (US); Ramesh Nadella, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/459,416

(22) Filed: Jul. 1, 2019

(65) Prior Publication Data
US 2019/0327145 A1 Oct. 24, 2019

Related U.S. Application Data

(63) Continuation of application No. 15/680,119, filed on Aug. 17, 2017, now Pat. No. 10,389,590.

(51) Int. Cl.
*H04L 12/24* (2006.01)
(52) U.S. Cl.
CPC .......... *H04L 41/0853* (2013.01); *H04L 41/12* (2013.01); *H04L 41/145* (2013.01); *H04L 41/5054* (2013.01); H04L 41/0806 (2013.01); H04L 41/5096 (2013.01)

(58) Field of Classification Search
CPC . H04L 41/0806; H04L 41/0853; H04L 41/12; H04L 41/145; H04L 41/5054; H04L 41/5096
USPC ....................................................... 709/222
See application file for complete search history.

(56) References Cited

U.S. PATENT DOCUMENTS

| 2016/0248858 | A1* | 8/2016 | Qiu | H04L 67/10 |
| 2018/0024852 | A1* | 1/2018 | Yabushita | G06F 9/5077 718/1 |
| 2018/0041437 | A1* | 2/2018 | Nishijima | H04L 49/70 |
| 2018/0123943 | A1* | 5/2018 | Lee | H04L 45/28 |
| 2018/0337931 | A1* | 11/2018 | Hermoni | G06F 16/955 |

* cited by examiner

*Primary Examiner* — Glenford J Madamba

(57) ABSTRACT

Techniques described herein may be used to condense a large quantity of Virtual Network Function (VNF) chains (that each correspond to a network service) into a much smaller quantity of VNF records; and extract any of the large quantity of VNF chains from the smaller quantity of network service records. This may be accomplished by assigning a Number (No.) of Services attribute and a Tier attribute into each VNF record. The No. of Services attribute and Tier attribute may enable the VNF records to reference one another such that the larger quantity of VNF chains may, in effect, be entirely represented by the much smaller quantity of VNF records, thereby conserving storage space, streamlining VNF chain management, and reducing the processing and memory capacity required to search, configure, and deploy virtual network services.

20 Claims, 11 Drawing Sheets

VNF Chains

| Network Service No. | Position 1 | Position 2 |
|---|---|---|
| 1 | VNF_1 | VNF_2 |
| 2 | VNF_1 | VNF_3 |
| ... | ... | ... |
| 42 | VNF_7 | VNF_6 |

Use No. of Services attribute and Tier attribute to condense large quantity of VNF chains into VNF records ➤

VNF Records

| Record No. | No. of Services | Tier | VNF ID |
|---|---|---|---|
| 1 | 2 | 1 | VNF_1 |
| 2 | 2 | 1 | VNF_2 |
| ... | ... | ... | ... |
| 7 | 2 | 1 | VNF_7 |
| 8 | 2 | 2 | VNF_8 |
| 9 | 2 | 2 | VNF_9 |
| ... | ... | ... | ... |
| 14 | 2 | 2 | VNF_14 |

| VNF Chains | | |
|---|---|---|
| Network Service No. | Position 1 | Position 2 |
| 1 | VNF_1 | VNF_2 |
| 2 | VNF_1 | VNF_3 |
| ... | ... | ... |
| 42 | VNF_7 | VNF_6 |

Use No. of Services attribute and Tier attribute to condense large quantity of VNF chains into VNF records →

| VNF Records | | | |
|---|---|---|---|
| Record No. | No. of Services | Tier | VNF ID |
| 1 | 2 | 1 | VNF_1 |
| 2 | 2 | 1 | VNF_2 |
| ... | ... | ... | ... |
| 7 | 2 | 1 | VNF_7 |
| 8 | 2 | 2 | VNF_8 |
| 9 | 2 | 2 | VNF_9 |
| ... | ... | ... | ... |
| 14 | 2 | 2 | VNF_14 |

Fig. 1A

| VNF Records | | | |
|---|---|---|---|
| Record No. | No. of Services | Tier | VNF ID |
| 1 | 2 | 1 | VNF_1 |
| 2 | 2 | 1 | VNF_2 |
| ... | ... | ... | ... |
| 7 | 2 | 1 | VNF_7 |
| 8 | 2 | 2 | VNF_8 |
| 9 | 2 | 2 | VNF_9 |
| ... | ... | ... | ... |
| 14 | 2 | 2 | VNF_14 |

Use No. of Services attribute and Tier attribute to extrapolate large quantity of VNF chains into VNF records →

| VNF Chains | | |
|---|---|---|
| Network Service No. | Position 1 | Position 2 |
| 1 | VNF_1 | VNF_2 |
| 2 | VNF_1 | VNF_3 |
| ... | ... | ... |
| 42 | VNF_7 | VNF_6 |

Fig. 1B

| Record No. | No. of VNFs | Tier | VNF ID | Vendor | Function Type | Configuration File | Bootstrap File | Network Descriptor File |
| --- | --- | --- | --- | --- | --- | --- | --- | --- |
| 1 | 1 | 1 | VSRX | Company A | ROUTING | BLOB | BLOB | BLOB |
| 2 | 1 | 1 | PA | Company B | SECURITY | BLOB | BLOB | BLOB |
| 3 | 3 | 1 | VSRX | Company A | ROUTING | BLOB | BLOB | BLOB |
| 4 | 3 | 2 | PA | Company B | SECURITY | BLOB | BLOB | BLOB |
| 5 | 3 | 2 | FG | Company C | SECURITY | BLOB | BLOB | BLOB |
| 6 | 3 | 3 | SH | Company D | WAN OPTIMIZATION | BLOB | BLOB | BLOB |

Fig. 5

| Network Service No. | VNF Chain | | |
| --- | --- | --- | --- |
| | Position 1 | Position 2 | Position 3 |
| 1 | VSRX | | |
| 2 | PA | | |
| 3 | VSRX | PA | SH |
| 4 | VSRX | FG | SH |

Fig. 6

| Record No. | No. of Services | Tier | VNF ID | ... |
|---|---|---|---|---|
| 1 | 1 | 1 | CSR | ... |
| 2 | 1 | 1 | ASAV | ... |
| 3 | 1 | 1 | VSRX | ... |
| 4 | 1 | 1 | PANFW | ... |
| 5 | 1 | 1 | FG | ... |
| 6 | 1 | 1 | SH | ... |
| 7 | 1 | 1 | VP | ... |
| 8 | 2 | 1 | CSR | ... |
| 9 | 2 | 1 | ASAV | ... |
| 10 | 2 | 1 | VSRX | ... |
| 11 | 2 | 1 | PANFW | ... |
| 12 | 2 | 1 | FG | ... |
| 13 | 2 | 1 | SH | ... |
| 14 | 2 | 1 | VP | ... |
| 15 | 2 | 2 | CSR | ... |
| 16 | 2 | 2 | ASAV | ... |
| 17 | 2 | 2 | VSRX | ... |
| 18 | 2 | 2 | PANFW | ... |
| 19 | 2 | 2 | FG | ... |
| 20 | 2 | 2 | SH | ... |
| 21 | 2 | 2 | VP | ... |
| ... | ... | ... | ... | ... |

Portion 1 (Records 1–9)
Portion 2 (Records 14–21)

Fig. 7

| Network Service No. | CHAINED VNFs | |
|---|---|---|
| | Position 1 | Position 2 |
| 1 | CSR | |
| 2 | ASAV | |
| 3 | VSRX | |
| 4 | PANFW | |
| 5 | FG | |
| 6 | SH | |
| 7 | VP | |
| 8 | CSR | ASAV |
| 9 | CSR | VSRX |
| 10 | CSR | PANFW |
| 11 | CSR | FG |
| 12 | CSR | SH |
| 13 | CSR | VP |
| 14 | ASAV | CSR |
| 15 | ASAV | VSRX |
| 16 | ASAV | PANFW |
| 17 | ASAV | FG |
| 18 | ASAV | SH |
| 19 | ASAV | VP |
| ... | ... | ... |

TIER BASED VIRTUAL NETWORK FUNCTION CHAINING DESIGN

This application is a Continuation of U.S. patent application Ser. No. 15/680,119 (U.S. Patent Application Pub. No. 2019/0058633), titled "TIER BASED VIRTUAL NETWORK FUNCTION CHAINING DESIGN," filed Aug. 17, 2017, the contents of which are hereby incorporated by reference.

BACKGROUND

Network services (e.g., routing services, security services, etc.) may be provided in the form of one or more Virtual Network Functions (VNFs). Network services may be implemented over a distributed computing system, such as a cloud computing environment. Managing and operating a cloud computing environment that provides network services via VNFs may include storing records of the VNFs that correspond to each network service.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

FIGS. 1A and 1B illustrates an example overview of an embodiment described herein;

FIG. 5 is a diagram of example Virtual Network Function (VNF) records;

FIG. 6 is a diagram of an example of network services and VNFs corresponding to the VNF records of FIG. 5;

FIG. 7 is a diagram of another example VNF records;

FIG. 8 is a diagram of an example of the unique VNF chains that may be extracted from some of the records of FIG. 7;

DETAILED DESCRIPTION OF PREFERRED EMBODIMENTS

Figure 2:
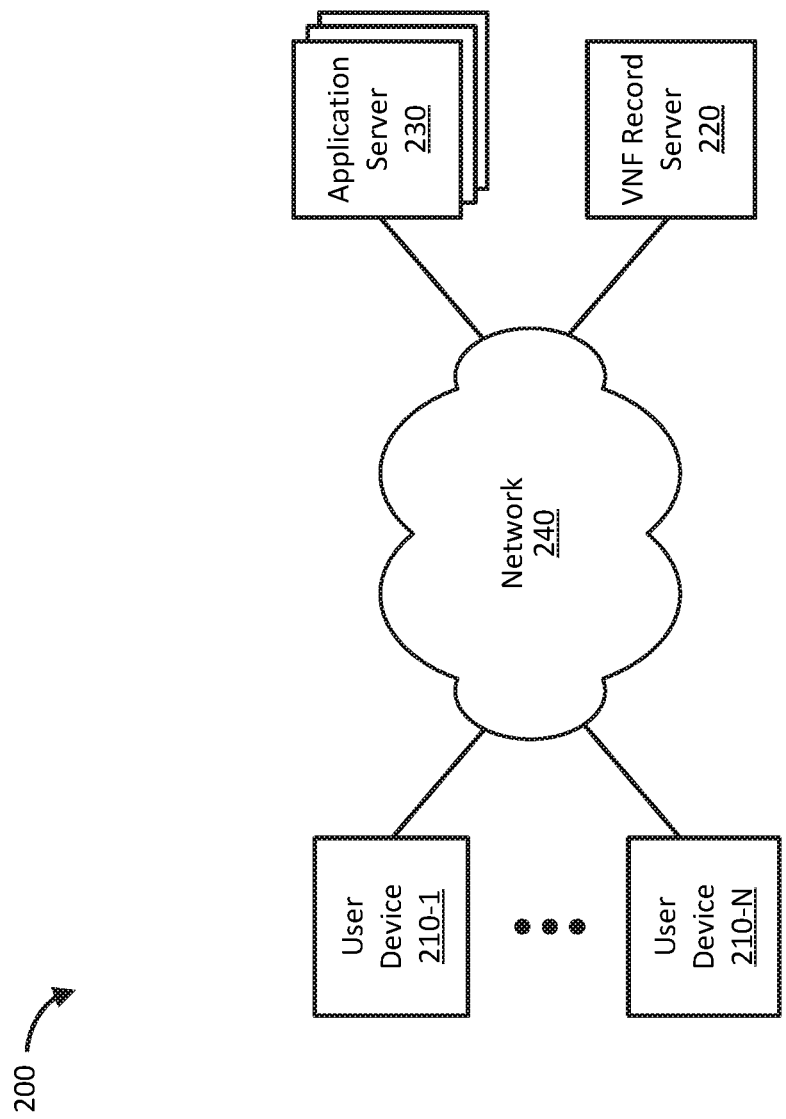
FIG. 2 is a diagram of an example environment in which systems and/or methods described herein may be implemented.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the appended claims and their equivalents.

Virtualization of network services may include deploying (e.g., providing, making available, etc.) one or more Virtual Network Functions (VNFs) within a cloud computing environment. Examples of a VNF may include authentication services, authorization services, data storage services, routing services (e.g., routing data between different VNFs), security services, network management services, etc. A cloud computing environment may include a cluster of servers that share computing resources (e.g., processing capacity, memory capacity, storage capacity, etc.) while providing a distributed platform for deploying VNFs. A network service may involve a single VNF or multiple VNFs that are, for example, functionally linked or enabled to communicate with one another. An example of a network function involving multiple VNFs (referred to herein as a VNF chain) may include a routing VNF that is combined with a security VNF to provide a secure routing service.

Before network services are deployed in a cloud computing environment, records of the network services may be stored in a database or another type of data structure. A record of a network service (also referred to herein as "network service record") may include the VNF (or VNFs) associated with the network service. As the number of VNF chains increases, the number of network service records that are to be stored may increase considerably since a network service record may be created for each VNF chain (e.g., each combination and differential ordering of VNFs), thereby requiring considerable resources (e.g., storage resource, processing resource, memory resource, time and energy from system operators or administrators, etc.) to manage, maintain, and deploy VNF chains.

The techniques described herein may be used to condense a large quantity of VNF chains into a much smaller quantity of network service records; and to extract and deploy any one of the large quantity of VNF chains from the much smaller quantity of network service records. This may be accomplished by assigning a Number (No.) of Services attribute and a Tier attribute to each network service record. The No. of Services attribute and Tier attribute may enable an inter-referencing technique to be applied to the network service records, such that a large quantity of VNF chains may be represented by a much smaller quantity of network service records, thereby conserving storage space, streamlining VNF chain creation and management, and reducing the processing and memory capacity required to search, configure, and deploy network services.

FIGS. 1A and 1B illustrates an example overview of an embodiment described herein. FIG. 1A is a diagram of an example of condensing a large quantity of VNF chains into a much smaller quantity of VNF records; and FIG. 1B is a diagram of an example of extracting the large quantity of VNF chains from the VNF records. As described herein, condensing VNF chains into VNF records and/or extracting VNF chains from VNF records may be performed by a computing device, such as a VNF record server as described herein.

As shown, the example of FIGS. 1A and 1B include 42 VNF chains that may be condensed into, and extracted from, 14 VNF records. Each illustrated VNF chain may include a unique arrangement (e.g., combination and ordering) of 2 VNFs from a total of 7 different VNFs. Additionally, a VNF chain may include several attributes, such as a Network Service No., that functions as a unique identifier for the VNF chain and multiple VNFs (e.g., VNF_1, VNF_2, etc.). Each VNF of the VNF chain may be assigned a position (e.g., Position 1, Position 2, etc.) in the VNF chain, which may correspond to the manner in which the VNFs communicate or otherwise function with respect to one another. For instance, a VNF chain consisting of a routing VNF in a first position, a security VNF in a second position, and a network optimization VNF in a third position may function such that the routing VNF determines the routing of data; once the routing is determined, security protocols (e.g., encryption techniques and protocols) may be applied to the data; and once the routing and security is determined, network optimization (e.g., when/how to buffer the data, when/how to pass the data from one VNF to another VNF, etc.) may be applied.

A VNF record may include several attributes, such as a Record No., No. of Services, Tier, and VNF ID. The Record No. attribute may function as a unique identifier for the VNF record. The No. of Services attribute may indicate the number of VNFs involved in the network service to which the VNF record corresponds. The Tier attribute may indicate the position (e.g., Position 1, Position 2, etc.) of the VNF within a VNF chain, and the VNF ID attribute may function as a unique identifier of the VNF corresponding to the VNF record. Since the VNF chains of FIGS. 1A and 1B are each two VNFs in length, the No. of Services for each VNF record may be 2. Additionally, since each of the 42 VNF chains include a unique arrangement (e.g., combination and ordering) of 2 VNFs from a total of 7 different VNFs, VNF records 1-7 may include a Tier attribute value of 1, and VNF records 8-14 may include a Tier attribute value of 2.

The VNF records may be arranged in a table so that VNF chains with identical VNF prefixes (which may be the lack of a VNF prefix, one VNF, or multiple VNFs) are sequentially represented in the table, such that the sequential position of each VNF record in the table, in combination with the No. of Services attribute and the Tier attribute of each record, may be used to determine which VNF records correspond to the same VNF chain and the position of each VNF within the VNF chain. A VNF prefix, as described herein, may include the first X number of VNFs (preceding the VNF with the VNF prefix) in a VNF chain, where X<the number of VNFs in the VNF chain. The sequential position of each record in the table, in combination with the No. of Services attribute and the Tier attribute of each record, may enable a single VNF record to represent multiple scenario (e.g., a single VNF record may represent every VNF chain) in which the VNF, corresponding to the VNF record, is implemented at a particular position (e.g., the first VNF, second VNF, third VNF, etc., VNF) in a VNF chain of a particular length (e.g., 1 VNF, 2 VNFs, 3 VNFs, etc.).

For instance, while VNF_1 may be combined with 6 other VNFs (e.g., VNF_2 through VNF_7) to create 6 different VNF chains that are each 2 VNFs long, VNF_1 may occupy the same position in each of those 6 VNF chains. As such, a single VNF record may represent VNF_1 at that position for all 6 VNF chains. Representing VNFs in this manner may enable the use and reuse of VNF records (e.g., a single VNF record for VNF_1 at a particular position in 6 different VNF chains), thereby decreasing the overall resources (e.g., processing capacity, memory capacity, storage capacity, etc.) used to create, manage, maintain, and store VNF chain information. For example, as shown in FIGS. 1A and 1B, a server device (such as a VNF record server) may condense (or compress) the 42 VNF chains into only 14 VNF records and/or extract any one or all of the 42 VNF chains from the 14 VNF records.

In some embodiments, the server device may also configure and deploy VNF chains based on the VNF records. For example, a VNF record may include a Configuration File attribute that may indicate a file with instructions for automatically configuring the VNF of the VNF record, within the context of the VNF within the VNF chain (e.g., Position and No. of Services). A VNF record may also, or alternatively, include a Bootstrap File attribute that may indicate a file with instructions for automatically deploying the VNF. As such, the techniques described herein may greatly reduce the storage space required to represent a large number of VNF chains (i.e., network services), in addition to providing an automated solution for configuring and deploying network services.

FIG. 2 is a diagram of an example environment 200 in which systems and/or methods described herein may be implemented. Environment 200 may include user device 210 (which may be referred to herein individually as "UE 210" or collectively as "user devices 210"), VNF record server 220, one or more application servers 230 (which may be referred to herein individually as "application server 230" or collectively as "application servers 230"), and network 240.

The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices that facilitate or enable communication between various components shown in environment 200, such as routers, modems, gateways, switches, hubs, etc. Alternatively, or additionally, one or more of the devices of environment 200 may perform one or more functions described as being performed by another device of environment 200. Additionally, the devices of environment 200 may interconnect with each other, and/or other devices, via wired connections, wireless connections, or a combination of wired and wireless connections. In some embodiments, one or more devices of environment 200 may be physically integrated in, and/or may be physically attached to, one or more other devices of environment 200. Also, while "direct" connections are shown in FIG. 2 between certain devices, some devices may communicate with each other via one or more additional devices and/or networks.

User device 210 may include a portable computing and communication device, such as a personal digital assistant (PDA), a smart phone, a cellular phone, a laptop computer with connectivity to network 250. User device 210 may connect to network 250 via a base station of a wireless telecommunication network, a Wi-Fi access point and Internet modem, etc. User device 210 may also include a non-portable computing device, such as a desktop computer, a consumer or business appliance, or another device that can connect to a radio access network (RAN) of the wireless telecommunications network. User device 210 may also include a computing and communication device that may be worn by a user (also referred to as a wearable device) such as a watch, a fitness band, a necklace, glasses, an eyeglass, a ring, a belt, a headset, or another type of wearable device.

VNF record server 220 may include one or more computing devices, such as a server device or a collection of server devices, capable of communicating with other devices (e.g., user devices 210 and application servers 240) via network 240. VNF record server 220 may include an operating system and/or other software that enables VNF record server 220 to perform one or more of the operations described herein. For example, VNF record server 220 may receive and process instructions to create VNF records that represent VNF chains, assign a No. of Services attribute and a Tier attribute to each VNF record (to condense the number of VNF records required to represent the VNF chains), and extract any of the VNF chains based on the VNF records.

Application servers 230 may include one or more computing devices, such as a server device or a collection of server devices, capable of communicating with other devices (e.g., user devices 210, VNF record server 220, etc.) via network 240. Application servers 230 may include an operating system and/or other software that enable application servers 230 to perform one or more of the operations described herein. In some embodiments, application servers 230 may provide a cloud computing environment (e.g., a distributed computing platform that shares resources) within which network services (via VNF chains) may be provided as VNFs.

Network 240 may include one or more wired and/or wireless networks. For example, network 240 may include a cellular network (e.g., a second generation (2G) network, a third generation (3G) network, a fourth generation (4G) network, a fifth generation (5G) network, a Long-Term Evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 240 may include a local area network (LAN), a wireless LAN (WLAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

Figure 3:
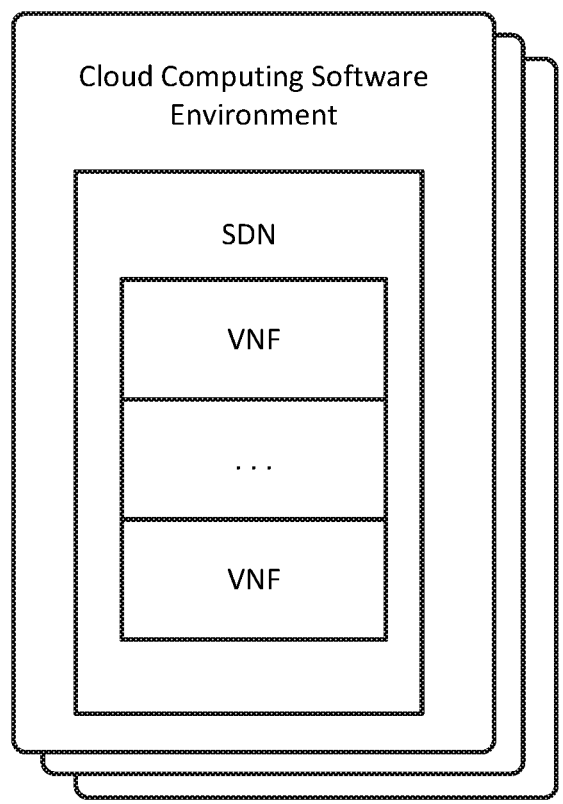
FIG. 3 is a diagram of an example of a cloud computing environment.

FIG. 3 is a diagram of an example of a cloud computing environment. The cloud computing environment may include a dynamic processing and storage environment distributed across a plurality of server devices. As shown, the cloud computing environment may include a Software Defined Network (SDN) with virtual network functions (VNFs). In some embodiments, the SDN may include one or more virtual devices and/or or another type of virtual entity.

Figure 4:
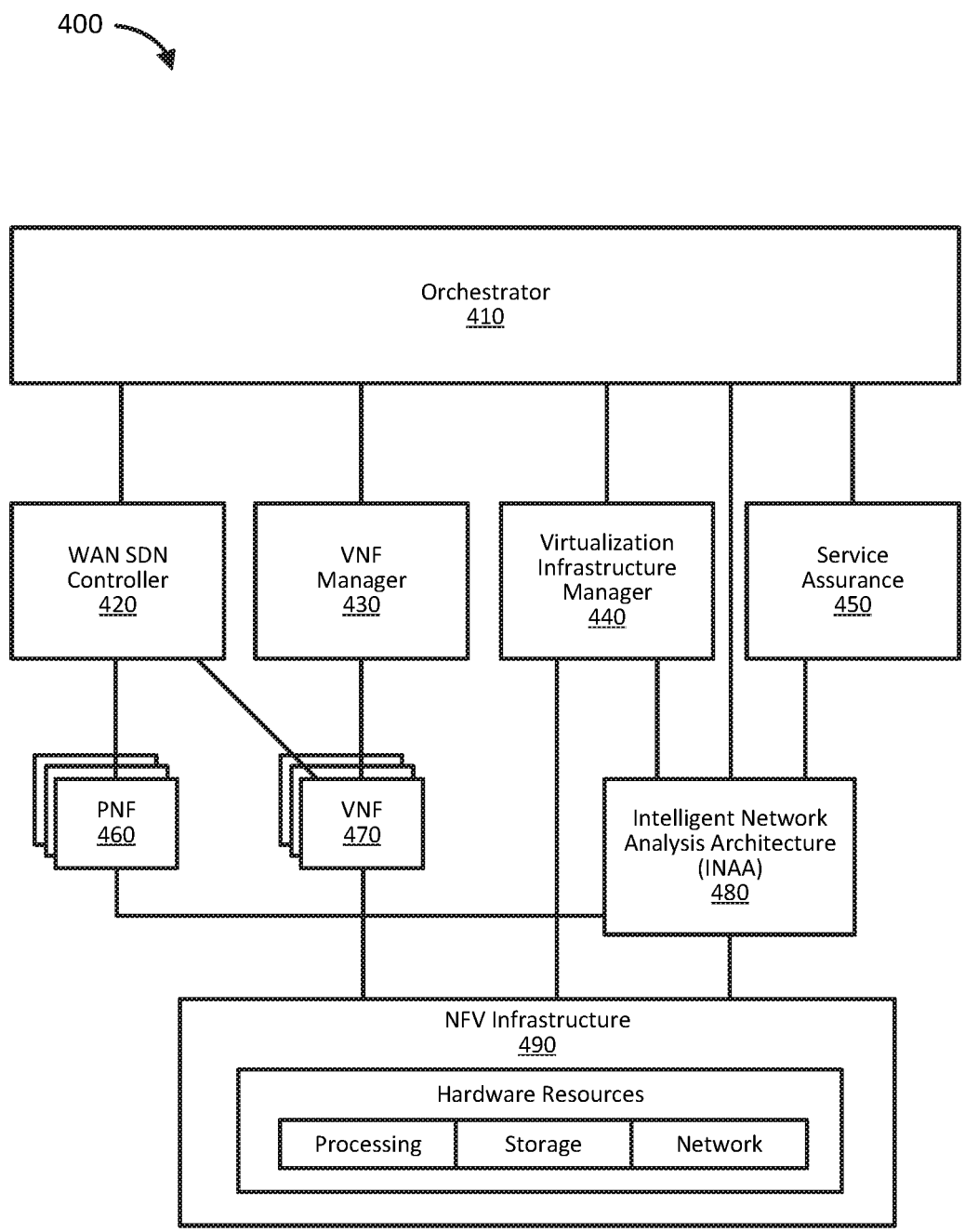
FIG. 4 is a diagram of an example of a virtual network that may be deployed across multiple, interconnected server devices.

FIG. 4 is a diagram of an example of a virtual network 400 that may be deployed across multiple, interconnected server devices. Virtual network 400 may be an example of a Software Defined Network (SDN). As described below, virtual network 400 may be virtualized embodiments of physical devices (e.g., a router, a hub, a server, a data storage device, etc.) or a function of a physical device (e.g., an authentication and authorization function, a user account management function, a customer billing function, etc.). In practice, types of virtual devices and/or VNFs implemented by virtual network 400 may vary.

As shown, virtual network 400 may include orchestrator 410, wide area network SDN (WAN SDN) controller 420, VNF manager 430, virtualization infrastructure manager 440, service assurance 450, physical network functions (PNFs) 460, virtual network functions 470, intelligent network analysis architecture (INAA) 480, and network function virtualization (NFV) infrastructure (NFVI) 490. Virtual network 400 may include a combination of virtualized functions (block 410-450 and 470-490) and physical devices (also referred to as PNFs 460). In some embodiments, the virtual functions may be implemented on one or more application servers 230 of a data center, while PNFs 460 may be implemented by one or more computing and/or communication devices (e.g., user device 210, a router, a server device, etc.).

Orchestrator 410 may be responsible for allocating, instantiating, and activating network functions throughout virtual network 400. WAN SDN controller 420 may be responsible for control connectivity services in a WAN operated by example network 400. VNF manager 430 may be responsible for VNF lifecycle management, which may include instantiation of VNFs, upgrading VNFs, scaling for VNFs, terminating VNFs, etc. Virtualization infrastructure manager 440 may be responsible for allocating physical resources (e.g., processing capacity, memory capacity, storage capacity, etc.) to the embodiment of the virtualized functions of example network 400. In some embodiments, the physical resources managed by virtualization infrastructure manager 440 may include the physical resources of one or more server devices 230 of a data center.

Service assurance 450 may be responsible for collecting and monitoring data, which may include events, conditions, messages, performance levels, etc., of virtual network 400. For example, the information collected and monitored by service assurance 450 may enable INAA 480 to determine, and function to address, faults within the network, determine appropriate corrections for the faults in the network, etc. The collected data may be used by one or more virtual functions of network 400. PNF 460 may include a network function that may rely on dedicated hardware and software for part of its functionality. In some embodiments, PNFs 460, such as PNFs that correspond to enhanced Node Bs (eNBs) may be controlled by WAN SDNs 420 (as shown); however, other types of PNFs may be controlled by other types of devices and/or functions. In some embodiments, PNF 460 may include an eNB or another type of device through which user devices may connect to example network 400. In some embodiments, data from PNFs may be inputs to INAA 480.

VNFs 470 may include a software embodiment of a network device (and/or a function of a network device). Examples of VNFs 470 may include one or more devices of an Evolved Packet Core (EPC), such as a Serving Gateway (SGW), Packet Gateway (PGW 340), Mobility Management Entity (MME), etc. INAA 480 may be responsible for identifying faults occurring within network 400, determining appropriate corrections to the faults, implementing the correction in order to remedy the fault, and more. NFVI 490 may include hardware (e.g., processors, memory, storage capacity, etc.) and software components (e.g., an operating system, applications for creating and managing VNFs, etc.) upon which the virtual functions of network 400 are deployed.

The quantity of physical and virtual components, illustrated in FIG. 4, is provided for explanatory purposes only. In practice, network 400 may include additional components, fewer components, different components, or differently arranged components than illustrated in FIG. 4. Alternatively, or additionally, one or more of the components of network 400 may perform one or more functions described as being performed by another component of network 400. In some embodiments, one or more components of network 400 may be physically (or virtually) integrated in, and/or may be physically (or virtually) attached to, one or more other components of network 400. Also, while "direct" connections are shown in FIG. 4 between certain components, some components may communicate with each other via one or more additional components.

FIG. 5 is a diagram of example VNF records. In some embodiments, VNF records may be created, managed, and stored by VNF record server 220. As described herein, VNF records may be used to deploy VNF chains in cloud computing environment of application servers 230. FIG. 5 is described below with reference to FIG. 6, which includes a diagram of an example of network services and VNFs corresponding to the VNF records of FIG. 5.

As shown, each VNF record (Record No. 1-6) may include one or more attributes, such as Record Number (No.), No. of VNFs, Tier, VNF identity (ID), Vendor, Function Type, Configuration File, Bootstrap File, Network Descriptor File, etc. The attributes of the VNF records of FIG. 5 are provided as an example. In practice, the attributes of a particular VNF record may vary (e.g., in type, quantity, value, etc.).

Record No. may include a unique identifier for a VNF record. No. of VNFs may indicate the total number of services in a chain of VNFs that correspond to a particular VNF record. Tier may indicate the position of a particular VNF in a chain of VNFs. VNF ID may indicate an actual VNF that corresponds to a particular VNF record. Vendor may indicate the company (or other organization) that developed, sells, maintains, or is otherwise associated with a particular VNF. Function Type may indicate a functional category (e.g., routing, security, network management, etc.) to which the VNF, of the VNF record, corresponds. Configuration file may indicate a file (or other type of data structure) that contains Layer 2 (L2) and/or Layer 3 (L3) configuration information for the VNF (e.g., specifying settings information, setting function variables, etc.), of the VNF record, within the context of the VNF chain (e.g., the position of the VNF in the VNF chain). Bootstrap File may indicate a file (or another type of data structure) that contains instructions for deploying (e.g., installing or otherwise making available) an instance of the VNF, of the VNF record, within the context of the VNF chain. Network Descriptor File may indicate a file (or another type of data structure) that includes information regarding a network environment (e.g., a cloud computing environment, SDN, etc.) within which the VNF and corresponding VNF chain may be deployed and executed.

Network services may be provided based on, and found in, the VNF records of FIG. 5. For instance, Record No. 1 may correspond a network service that consists of 1 VNF since the No. of VNFs attribute for Record No. is 1. Since there is only 1 VNF for the network service, the Tier for the VNF is also 1. The actual VNF that corresponds to the network service is represented as "VSRX," and the information for deploying and executing the network service (e.g., Configuration File, Bootstrap File, etc.) is also provided in Record No. 1. The network service for Record No. 2 is a similar (e.g., with No. of VNFs being 1) but that Record No. 2 corresponds to the VNF represented as "PA." As such, Network Service No. 1 and Network Service No. 2, of FIG. 6, include only 1 VNF each—VSRS and PA, respectively.

By contrast, the remaining VNF records (Record No. 3-5) correspond to network services that includes three VNFs. For instance, the value of the No. of VNFs attribute for Record No. 3 is 3 and the value of the Tier attribute for Record No. 3 is 1, indicating that the VNF corresponding to Record No. 3 (VSRX) is the first VNF (indicated by the Tier attribute of Record No. 3) in a VNF chain consisting of 3 VNFs (indicated by the No. of VNFs attribute of Record No. 3). As such, Network Service No. 3, of FIG. 6, includes VSRX in a first position of the VNF chain of Network Service No. 3.

Referring again to FIG. 5, Record No. 4 corresponds to a VNF with a No. of VNFs value of 3 and a Tier value of 2, indicating that the VNF corresponding to Record No. 4 (PA) is the second VNF (indicated by the Tier attribute of Record No. 4) in the VNF chain consisting of 3 VNFs (indicated by the No. of VNFs attribute of Record No. 4). Therefore, since Record No. 3 and Record No. 4 have the same value for the No. of VNFs attribute (3) but have different values for the Tier attribute (1 and 2, respectively), it is evident that the VNF corresponding to Record No. 3 may occupy a first position in a VNF chain and the VNF corresponding to Record No. 4 may occupy the second position in the same VNF chain. As such, Network Service No. 3, of FIG. 6, includes PA in a second position of the VNF chain of Network Service No. 3. In other words, the VNF records may be arranged in the table so that VNF chains with identical VNF prefixes are sequentially arranged in the table such that subsequent VNF records in the table can use previous VNF records to determine which records correspond to a particular VNF chain (e.g., based on the length of the VNF chain, the actual VNFs of the VNF chain, and the position of each VNF within the VNF chain).

Referring again to FIG. 5, Record No. 5 corresponds to a VNF with a No. of VNFs value of 3 and a Tier value of 2, indicating that the VNF corresponding to Record No. 5 (FG) is the second VNF (indicated by the Tier attribute of Record No. 5) in the VNF chain consisting of 3 VNFs (indicated by the No. of VNFs attribute of Record No. 5). Since Record No. 4 and Record No. 5 each correspond to the same No. of VNFs (3) and the same Tier (2), it is evident that the VNFs for Record No. 4 and Record No. 5 do not correspond to the same VNF chain. Additionally, since Record No. 3 and Record No. 5 have the same value for the No. of VNFs attribute (3) but have different values for the Tier attribute (1 and 2, respectively), it is evident that the VNF corresponding to Record No. 3 may occupy a first position in a VNF chain and the VNF corresponding to Record No. 4 may occupy the second position in the same VNF chain. As such, Network Service No. 4, of FIG. 6, includes VSRX in a first position and FG in a second position of the VNF chain of Network Service No. 4.

Referring again to FIG. 5, Record No. 6 corresponds to a VNF with a No. of VNFs value of 3 and a Tier value of 3, indicating that the VNF corresponding to Record No. 4 (SH) is the third VNF (indicated by the Tier attribute of Record No. 6) in the VNF chain consisting of 3 VNFs (indicated by the No. of VNFs attribute of Record No. 6). Therefore, since Record No. 3-5 each have the same value for the No. of VNFs attribute (3) but have different values for the Tier attribute (1, 2 or 3), it is evident that the VNF corresponding to Record No. 6 may occupy the third position in the VNF chains of the VNFs for Record No. 3-5. As such, Network Service No. 3 and 4, of FIG. 6, include SH in a third position of the VNF chain of Network Service No. 3 and 4. As such, the techniques described herein enable network services consisting of unique VNF chains to be created and deployed based on VNF records with a simplified and standardized format and attribute set.

FIG. 7 is a diagram of another example VNF records. The VNF records may be created, managed, and stored by VNF record server 220. Additionally, the VNF records may be used to deploy VNF chains in cloud computing environment of application servers 230. FIG. 7 is described below with reference to FIG. 8, which includes a diagram of an example of network services and VNFs corresponding to the VNF records of FIG. 7.

As shown, the VNF records of FIG. 7 may include attributes, such as Record No., No. of Services, Tier, VNF ID, and more. In some embodiments, the VNF records of FIG. 7 may also include one or more of the attributes discussed above with reference to FIG. 5. Additionally, while the VNF records of FIG. 7 are limited to 14 VNF records, in some embodiments, VNF record server 220 may include many more VNF records. The VNF records of FIG. 7 include 7 records (Record No. 1-7) of with a No. of Services value, and a Tier value, of 1. The VNF records of FIG. 7 also include 7 records (Record No. 8-14) with a No. of Services value of 2 and Tier value of 1; and 7 more records (Records No. 15-21) with a No. of Services value of 2 and a Tier value of 2.

FIG. 8 is a diagram of an example of the unique VNF chains (or network services) that may be extracted from some of the records of FIG. 7. The manner in which the network service may be extracted from the VNF records of FIG. 7 may be similar to the technique described above with reference to FIGS. 5-6. As such, network Service No. 1-7 of FIG. 8 may correspond to the Record No. 1-7 of Portion 1 of FIG. 7; and network Service No. 8-19 of FIG. 8 may correspond to Record No. 8-9 of Portion 1 and Record No. 15-21 of Portion 2 of FIG. 2. The remainder of the VNF records of FIG. 7 may be extracted in a similar manner to generate a much larger quantity of unique VNF chains than the VNF records upon which the VNF chains are based.

The number of unique VNF chains that are created by a number of VNF records may be mathematically summarized as: the number of VNF records=$N!/R!(N-R)!$; and the corresponding number of unique VNF chains=$N!/(N-R)!$, where N is the number of VNFs and R is the length of the VNF chain. For example, in a scenario involving 7 different VNFs and VNF chain lengths of 1-3, the techniques described herein may be used to create 259 unique VNF chains from only 35 individual VNF records; 7 of the VNF records may correspond to network services consisting of only 1 VNF (e.g., VNF records with a No. of Services value of 1); 14 of the VNF records may correspond to network services consisting of 2 VNFs (e.g., VNF records with a No. of Services value of 2); and 21 of the VNF records may correspond to network services consisting of 3 VNFs (e.g., VNF records with a No. of Services value of 3). The 7 VNF records with a No. of Services value of 1 may correspond to 7 of the 259 VNF chains; the 14 VNF records with a No. of Services value of 2 may correspond to 42 of the 259 VNF chains; and the 21 VNF records with a No. of Services value of 3 may correspond to 210 of the 259 VNF chains.

Figure 9:
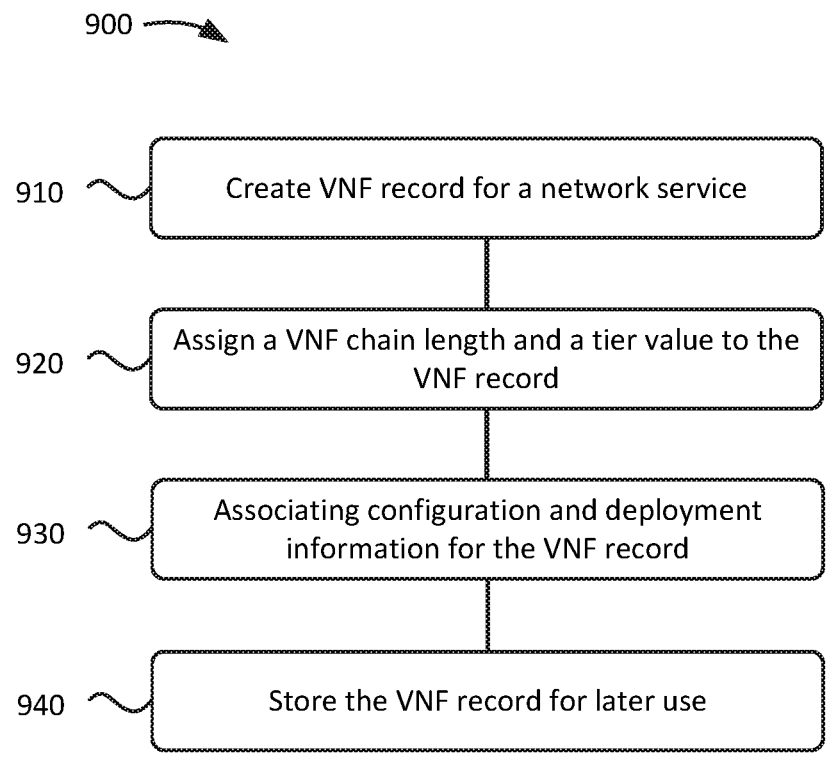
FIG. 9 is a diagram of an example process for creating a VNF record.

FIG. 9 is a diagram of an example process 900 for creating a VNF record. Process 900 may be performed by VNF record server 220.

As shown, process 900 may include creating a VNF record for a network service (block 910). For example, VNF record server 220 may receive a request from an operator or administrator to create a VNF record, and VNF record server 220 may create an empty VNF record (i.e., a VNF record with no attribute values) and populate the VNF record with one or more of the VNF record attributes described herein (e.g., a record number, a VNF ID, a vender, etc.)

Process 900 may include assigning a VNF chain length and a tier value to the VNF record (block 920). For instance, VNF record server 220 may receive an input from the operator or administrator as to the VNF chain length (or No. of VNFs) for the VNF record, and VNF record server 220 may associate the VNF record with the VNF chain length. Similarly, VNF record server 220 may receive an input from the operator or administrator as to a Tier attribute for the VNF record, and VNF record server 220 may associate the VNF record with the tier value received.

Process 900 may include associating deployment and configuration information to the VNF record (block 930). For example, VNF record server 220 may receive an input from the operator or administrator as to one or more files with instructions to automatically configure and deploy an instance of the VNF corresponding to the VNF record. In response, VNF record server 220 may associate the VNF record with the configuration and deployment files, which may include populating a Configuration File attribute, a Bootstrap File attribute, etc., of the VNF record.

Process 900 may also include storing the VNF record for later use (block 950). For example, VNF record server 220 may receive a request from the operator or administrator to store the VNF record (e.g., once the VNF record has been completely or adequately populated). In response to the request, VNF record server 220 may store the VNF record in a database or another type of data structure so that the VNF record may later be used to configure and deploy an instance of the network service to which the VNF record corresponds.

Figure 10:
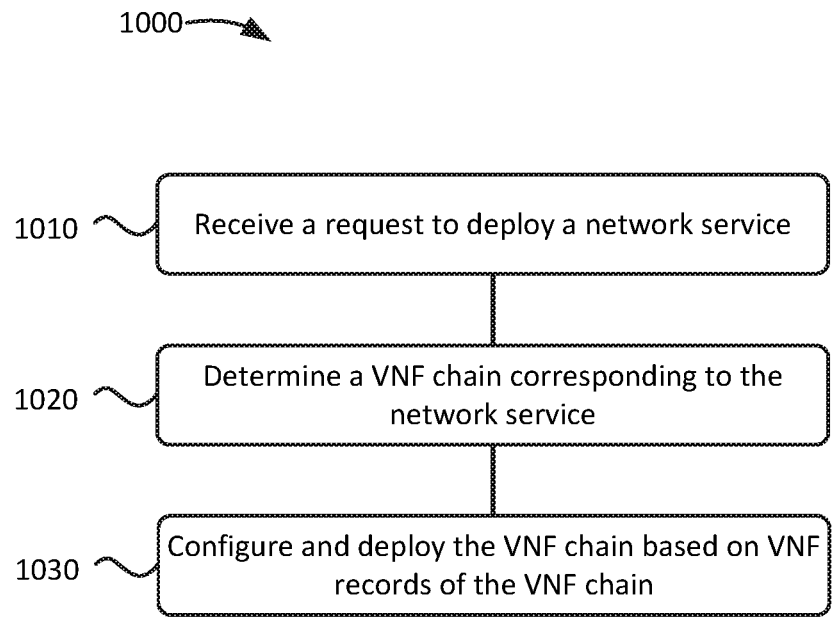
FIG. 10 is a diagram of an example process for creating a VNF record.

FIG. 10 is a diagram of an example process 1000 for creating a VNF record. Process 900 may be performed by VNF record server 220.

As shown, process 1000 may include receiving a request to deploy a network service (block 1010). For example, VNF record server 220 may receive a request from an operator or an administrator to deploy a network service that includes one or more VNFs. The request may identify a VNF or VNF record corresponding to the network service.

Process 1000 may also include determining a VNF chain based on the request (block 1020). For instance, based on the request, VNF record server 220 may identify one or more VNF records corresponding to the requested the network service. In some embodiments, the request itself may indicate the VNF records corresponding to the network service. In some embodiments, the request may include the VNF chain corresponding to the network service. In such embodiments, VNF record server 220 may extract VNF chains from stored VNF records until VNF record server 220 can identify the VNF records that correspond to the VNF chain of the request. In some embodiments, VNF record server 220 may reduce the quantity of VNF records used to extract the VNF chain by first determining the quantity of VNFs involved in the VNF chain and extrapolating only the VNF records with a No. of Services value that equals the quantity of VNFs involved. In some embodiments, VNF record server 220 may also, or alternatively reduce the quantity of VNF records used to extract the VNF chain by extrapolating only VNF records with a VNF ID, Vendor, and/or Function Type matching the VNFs provided in (or with) the request.

Process 1000 may also include configuring and deploying the VNF chain based on VNF records of the VN chain (block 1030). For example, VNF record server 220 may obtain configuration and deployment instructions for each VNF of the VNF chain based on the VNF records corresponding to the VNF chain. VNF record server 220 may obtain these instructions based on the Configuration File attribute, Bootstrap File attribute, and Network Description attribute of the VNF records in the VNF chain.

Figure 11:
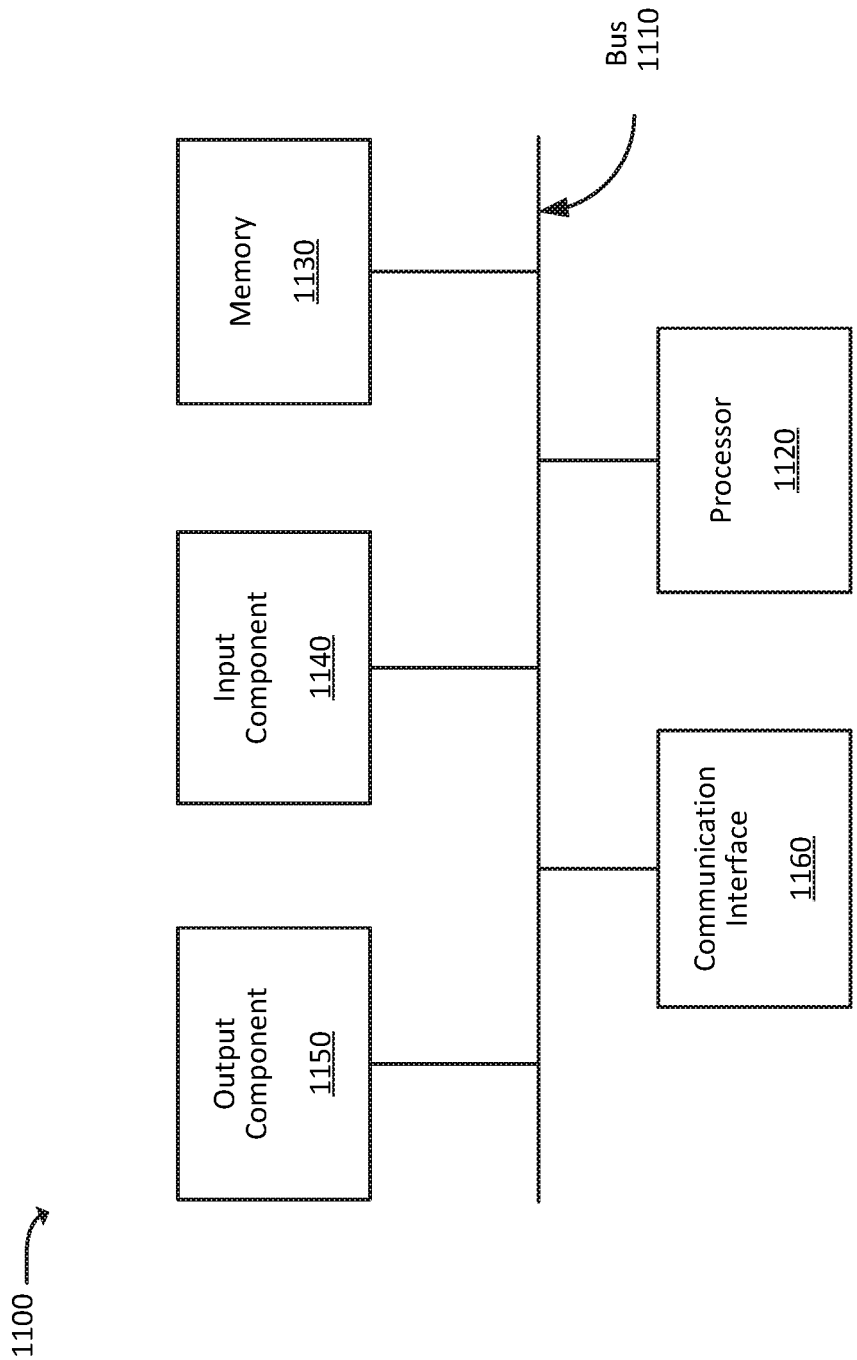
FIG. 11 is a block diagram of example components of a device.

FIG. 11 is a diagram of example components of a device 1100. Each of the devices illustrated in FIG. 2 may include one or more devices 1100. Device 1100 may include bus 1110, processor 1120, memory 1130, input component 1140, output component 1150, and communication interface 1160. In another embodiment, device 1100 may include additional, fewer, different, or differently arranged components. As described herein, a component may be implemented by hardware circuitry, software logic, and/or some combination thereof.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes (LEDs), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, embodiments described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope set forth in the claims that follow. The specification and drawings are accordingly to be regarded in an illustrative rather than restrictive sense.

For example, while a series of lines, arrows, and/or blocks have been described with regard to FIGS. 9 and 10 the order of the blocks and arrangement of the lines and/or arrows may be modified in other embodiments. Further, non-dependent blocks may be performed in parallel. Similarly, while series of communications have been described with regard to several of the Figures provided herein, the order or nature of the communications may potentially be modified in other embodiments.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operations and behaviors of the aspects that were described without reference to the specific software code-it being understood that software and control hardware could be designed to implement the aspects based on the description herein.

Further, certain portions may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be collected in accordance with all applicable laws, will not be released unless authorized by law, and shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   a non-transitory memory device storing a plurality of processor-executable instructions; and
   one or more processors configured to execute the processor-executable instructions, wherein executing the processor-executable instructions causes the one or more processors to:
   identify a plurality of Virtual Network Function (VNF) chains,
      wherein each VNF chain, of the plurality of VNF chains, includes a plurality of VNFs in a sequence that is different from sequences of VNFs included in other VNF chains of the plurality of VNF chains;
   determine a respective identifier for each VNF, of the plurality of VNFs;
   determine a sequential position of each VNF, of the plurality of VNFs, in each respective sequence of VNFs included in each VNF chain; and create a plurality of records based on the VNF identifiers and the determined sequential positions of each VNF, of the plurality of VNFs, in each VNF chain, wherein each record, of the plurality of created records, represents a particular VNF at a particular position within sequences of multiple VNF chains of the plurality of VNF chains.

2. The device of claim 1, wherein executing the processor-executable instructions further causes the one or more processors to:
receive configuration instructions for automatically configuring each VNF, of the plurality of VNFs, of each VNF chain, to operate within a context that is particular to the different sequential position of each VNF; and
associate the configuration instructions with the plurality of VNF records of each VNF chain.

3. The device of claim 1, wherein executing the processor-executable instructions further causes the one or more processors to:
receive deployment instructions for automatically deploying each VNF, of the plurality of VNFs, of each VNF chain, within a cloud computing environment; and
associate the deployment instructions with the plurality of records.

4. The device of claim 1, wherein executing the processor-executable instructions further causes the one or more processors to:
receive network descriptor information that describes a network context in which each network service, of the plurality of network services is to be provided; and
associate the network descriptor information with the plurality of VNF records.

5. The device of claim 1, wherein executing the processor-executable instructions further causes the one or more processors to:
receive function type information that describes a functional category for each VNF, of the plurality of VNFs; and
associate the function type information with the plurality of VNF records.

6. The device of claim 1, wherein executing the processor-executable instructions further causes the one or more processors to:
receive a request to deploy a particular network service;
identify, based on the request, one or more records, of the plurality of records, that correspond to the network service; and
deploy an instance of the particular network service based on the identified records.

7. The device of claim 6, wherein the network service is configured to be part of a software-defined network (SDN).

8. A non-transitory computer readable medium, storing a plurality of processor-executable instructions, which, when executed by one or more processors, causes the one or more processors to:
identify a plurality of Virtual Network Function (VNF) chains,
wherein each VNF chain, of the plurality of VNF chains, includes a plurality of VNFs in a sequence that is different from sequences of VNFs included in other VNF chains of the plurality of VNF chains;
determine a respective identifier for each VNF, of the plurality of VNFs;
determine a sequential position of each VNF, of the plurality of VNFs, in each respective sequence of VNFs included in each VNF chain; and
create a plurality of records based on the VNF identifiers and the determined sequential positions of each VNF, of the plurality of VNFs, in each VNF chain,
wherein each record, of the plurality of created records, represents a particular VNF at a particular position within sequences of multiple VNF chains of the plurality of VNF chains.

9. The non-transitory computer-readable medium of claim 8, wherein the processor-executable instructions further include processor-executable instructions to:
receive configuration instructions for automatically configuring each VNF, of the plurality of VNFs, of each VNF chain, to operate within a context that is particular to the different sequential position of each VNF; and
associate the configuration instructions with the plurality of VNF records of each VNF chain.

10. The non-transitory computer-readable medium of claim 8, wherein the processor-executable instructions further include processor-executable instructions to:
receive deployment instructions for automatically deploying each VNF, of the plurality of VNFs, of each VNF chain, within a cloud computing environment; and
associate the deployment instructions with the plurality of records.

11. The non-transitory computer-readable medium of claim 8, wherein the processor-executable instructions further include processor-executable instructions to:
receive network descriptor information that describes a network context in which each network service, of the plurality of network services is to be provided; and
associate the network descriptor information with the plurality of VNF records.

12. The non-transitory computer-readable medium of claim 8, wherein the processor-executable instructions further include processor-executable instructions to:
receive function type information that describes a functional category for each VNF, of the plurality of VNFs; and
associate the function type information with the plurality of VNF records.

13. The non-transitory computer-readable medium of claim 8, wherein the processor-executable instructions further include processor-executable instructions to:
receive a request to deploy a particular network service;
identify, based on the request, one or more records, of the plurality of records, that correspond to the network service; and
deploy an instance of the particular network service based on the identified records.

14. The non-transitory computer-readable medium of claim 6, wherein the network service is configured to be part of a software-defined network (SDN).

15. A method, performed by a device, comprising:
identifying, by one or more processors of the device, a plurality of Virtual Network Function (VNF) chains,
wherein each VNF chain, of the plurality of VNF chains, includes a plurality of VNFs in a sequence that is different from sequences of VNFs included in other VNF chains of the plurality of VNF chains;
determining, by the one or more processors of the device, a respective identifier for each VNF, of the plurality of VNFs;
determining, by the one or more processors of the device, a sequential position of each VNF, of the plurality of VNFs, in each respective sequence of VNFs included in each VNF chain; and creating, by the one or more processors of the device, a plurality of records based on the VNF identifiers and the determined sequential positions of each VNF, of the plurality of VNFs, in each VNF chain,
- wherein each record, of the plurality of created records, represents a particular VNF at a particular position within sequences of multiple VNF chains of the plurality of VNF chains.

16. The method of claim 8, further comprising:
receiving configuration instructions for automatically configuring each VNF, of the plurality of VNFs, of each VNF chain, to operate within a context that is particular to the different sequential position of each VNF; and
associating the configuration instructions with the plurality of VNF records of each VNF chain.

17. The method of claim 8, further comprising:
receiving deployment instructions for automatically deploying each VNF, of the plurality of VNFs, of each VNF chain, within a cloud computing environment; and
associating the deployment instructions with the plurality of records.

18. The method of claim 8, further comprising:
receiving network descriptor information that describes a network context in which each network service, of the plurality of network services is to be provided; and
associating the network descriptor information with the plurality of VNF records.

19. The method of claim 8, further comprising:
receiving function type information that describes a functional category for each VNF, of the plurality of VNFs; and
associating the function type information with the plurality of VNF records.

20. The method of claim 8, further comprising:
receiving a request to deploy a particular network service;
identifying, based on the request, one or more records, of the plurality of records, that correspond to the network service; and
deploying an instance of the particular network service based on the identified records.

* * * * *